United States Patent [19]

Catchen

[11] Patent Number: 4,493,999
[45] Date of Patent: Jan. 15, 1985

[54] METHOD OF ENERGY RESOLVED GAMMA-RAY LOGGING

[75] Inventor: Gary L. Catchen, Ponca City, Okla.

[73] Assignee: Conoco Inc., Ponca City, Okla.

[21] Appl. No.: 329,441

[22] Filed: Dec. 10, 1981

[51] Int. Cl.³ .................. G01V 5/00; G21H 5/02
[52] U.S. Cl. ........................... 250/260; 250/303
[58] Field of Search .............................. 250/260, 303

[56] References Cited

U.S. PATENT DOCUMENTS

| | | |
|---|---|---|
| 2,947,359 | 8/1960 | Josendal et al. |
| 3,012,145 | 12/1961 | Erion et al. |
| 3,205,356 | 9/1965 | Owen |
| 3,247,377 | 4/1966 | Hall, Jr. |
| 3,465,151 | 9/1969 | Youmans |
| 3,507,340 | 2/1968 | Voetter |
| 3,654,464 | 4/1972 | Johnson, Jr. et al. |
| 3,697,752 | 10/1972 | Morgan et al. |
| 3,796,883 | 3/1974 | Smith et al. |
| 3,848,124 | 10/1974 | Vann |
| 3,894,584 | 7/1975 | Fertl |
| 4,085,798 | 4/1978 | Schweitzer et al. |
| 4,124,800 | 10/1978 | Mitchell et al. |
| 4,178,506 | 12/1979 | Fertl |
| 4,180,728 | 12/1979 | Goldstein et al. |
| 4,187,908 | 2/1980 | Fertl et al. |
| 4,223,727 | 9/1980 | Sustek, Jr. et al. |

OTHER PUBLICATIONS

Caldwell, R. L., "Tracers in Oil Wells: A Review of Recent Advances", Nucleonics, vol. 19, No. 2, Feb. 1961.

Primary Examiner—Alfred E. Smith
Assistant Examiner—T. N. Grigsby
Attorney, Agent, or Firm—A. J. Reinert

[57] ABSTRACT

A radioactive logging method for evaluating a wellbore and its surrounding formation in which gamma-ray emitting nuclides may be naturally present. A radioactive tracer is injected into the formation. The tracer emits gamma rays at at least one energy at which substantially none of the naturally present elements emit gamma rays. The wellbore is traversed with a gamma-ray detection system which is tuned to detect gamma rays at the one energy level of the tracer, thus providing a profile of tracer distribution in the formation.

3 Claims, 2 Drawing Figures

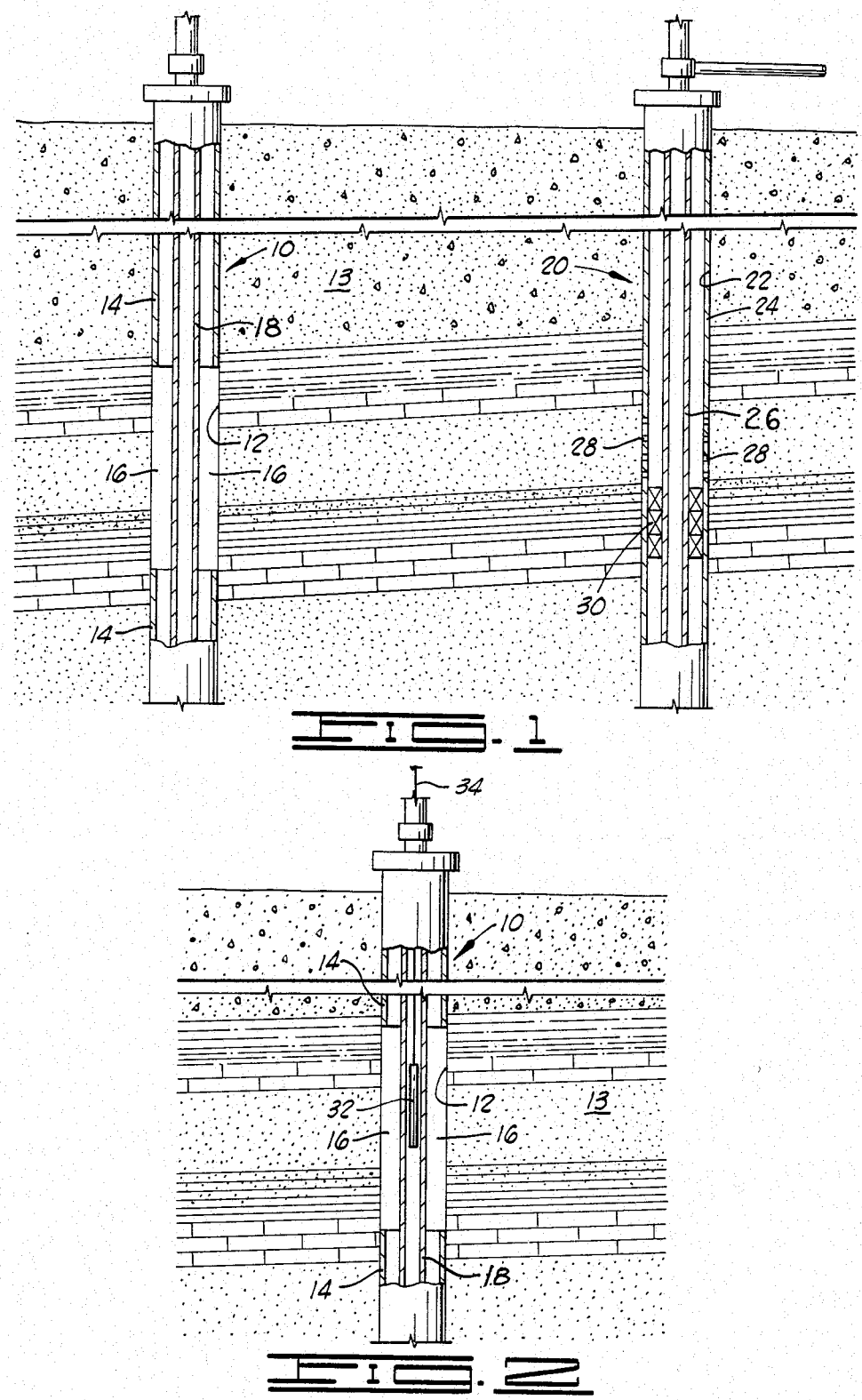

METHOD OF ENERGY RESOLVED GAMMA-RAY LOGGING

BACKGROUND AND SUMMARY OF THE INVENTION

The present invention relates to a new radioactive logging technique for use in a wellbore. More particularly, the invention concerns methods of evaluating a formation when an aqueous solution containing a radioactive tracer is injected into the formation.

At various stages of well completion and for different reasons, solutions may be injected into the formation surrounding the well. For example, treating agents are injected to consolidate loose formations about a perforated portion of the well casing in order to prevent production of sand and the like. In such sand consolidation treatments, and in similar treatments where fluid is injected into a formation, it may be desirable to include a radioactive tracer in the fluid to permit monitoring of the dispersion of the fluid in the formation with a radiation detector.

Fluids containing radioactive tracers are sometimes injected to derive information about the formation. Such injections are not for the purpose of treating the formation, as in a sand consolidation treatment, but rather to permit monitoring by a radiation detector of fluid movement in the formation in order to determine, for example, the location of a fracture or the amount of residual oil in the formation.

The above-described radioactive tracing procedures are complicated due to the fact that many formations include naturally-occurring radioactive elements. Thorium-232, uranium-238, uranium-235, their daughter nuclides, and potassium-40 constitute the great majority of radioactive elements which occur naturally. When a radiation detector is used to detect movement of a tracer-bearing fluid which has been injected in to a formation, gamma-ray emissions from naturally occurring elements in the formation may be detected by the radiation detector.

Most of the naturally-occurring radioactive elements emit gamma rays at several different energies. Sodium iodide crystals have been used in the past as well logging detectors. Such past detectors are designed to detect gamma ray energies over a selected energy spectrum. A tracer nuclide is selected that has at least one gamma-ray emission energy which is in the spectrum to be detected. The selected spectrum is broad enough so that gamma-ray emissions from naturally present elements are also detected. In order to obtain data relating to the dispersal of the tracer, a base log must be run prior to injection of the tracer. After the tracer is injected, a second log is run and the two logs are subtracted to delete information relating to gamma-ray emissions which are not produced by the tracer. Such past methods tend to produce somewhat inaccurate results because of the inherently poor resolution of this type of detector, i.e., approximately ±10%.

It is an object of the present invention to provide a method for monitoring a radioactive tracer in a formation with increased accuracy and selectivity.

It is another object of the invention to provide such a method wherein a base log need not be run.

The present method includes the steps of injecting a fluid containing a radioactive tracer into a formation. The selected tracer emits at least one gamma-ray having an energy different from any of the gamma-ray energies emitted by naturally occurring radioactive elements which may be present. After fluid injection, a logging sonde with a high resolution detector is used to detect tracer radiation in the formation. Such detectors have been used in the mining industry to measure the uranium ore content of a formation surrounding a test borehole. The selected energy detection spectrum of these detectors includes at least one gamma-ray emission energy of the tracer and excludes substantially all gamma-ray emission energies of the naturally occurring radioactive elements.

These and other objects and attendant advantages of the present invention will become apparent as further consideration is given to the following detailed description and accompanying drawings.

BRIEF DESCRIPTION OF THE DRAWINGS

FIG. 1 is a partial cross-sectional view of a well having an open hole interval and of an adjacent injection well.

FIG. 2 is a view of a radiation detector logging the well having the open hole interval in FIG. 1.

DETAILED DESCRIPTION OF THE INVENTION

Turning now to the drawing, and examining particularly FIG. 1, indicated generally at 10 is an oil well. The well is drilled to create a borehole 12 in formation 13; thereafter casing 14 is added to line the borehole. Well 10 has an open hole interval 16, above and below which casing 14 extends. Tubing 18 extends from the bottom of the well to the top and is coaxially aligned within casing 14. When well 10 is producing, a conventional liner may be positioned over the open hole interval.

Indicated generally at 20, is an injection well. Like well 10, injection well 20 is formed by drilling a borehole 22 through formation 13. Casing 24 lines the borehole and tubing 26 extends along the length of the well in concentric alignment with the casing. Casing 24 includes perforations 28 which extend about the circumference of the casing. The perforations are small holes in the casing which permit communication between fluids in the formation and the annulus formed between tubing 26 and casing 28. Conventional packers 30 seal the annulus between the tubing and the casing just beneath perforations 28. The seal extends about the circumference of the annulus between the tubing and the casing to prevent fluid communication between the annulus above and below the packers.

Turning to FIG. 2, well 10 is shown with logging sonde 32, which contains a radiation detector, suspended on a cable 34, inside tubing 18. Although not shown in the drawings, cable 34 is typically connected to a winch to facilitate lowering sonde 32 into well 10. Included in cable 34 are wires for conducting electrical signals generated by the detector and related instruments in sonde 32 to recording equipment and a computer (not shown) at the end of cable 34.

In FIG. 1, as has been previously mentioned, when well 10 is producing oil from formation 13, a conventional liner (not shown) may be used to line borehole 12 along open hole interval 16. The liner would prevent production of sand and the like from interval 16 which can adversely affect formation 13 as well as damage production equipment. If a significant amount of water production is experienced, it is desirable to determine whether or not such water is being produced in specific zones along the interval. If such water production is within specific zones, conventional water shutoff procedures can be utilized to diminish production of water.

In order to make such a determination, the liner is first removed from interval 16 leaving well 10 in the condition shown in FIG. 1. Water containing a radioactive tracer, in the instant embodiment, the tracer being cobalt-58, is injected in well 20 into the annulus formed between casing 24 and tubing 26. Packers 30 prevent any of the tracer-bearing fluid from flowing therebeneath. Accordingly, the fluid is injected into the formation via perforations 28. As the fluid is forced into the annulus of well 20, and from thence into the formation, a portion of the fluid travels through the formation to well 10 and emerges along open hole interval 16.

After such fluid injection has continued for a time, sonde 32 is lowered into tubing 18, in FIG. 2, in order to monitor the quantity and location of the tracer along interval 16. In the instant embodiment of the invention, sonde 32 contains a detector of the high resolution germanium type. Such a detector, as well as the sonde and associated instruments, is manufactured by Princeton Gamma-Tech Inc. and has in the past been used by the mining industry to measure the concentrations of various radioactive elements as it is moved through a borehole. In the decay of cobalt-58, several gamma rays of different energies are emitted. One of those energies is 811 keV (kiloelectronvolt or 1000 electronvolts). Utilization of the high resolution germanium type of detector permits resolution, at 811 keV, to within plus or minus one or two keV. In other words, the instruments in sonde 32 can separate gamma-rays having energies from approximately 810 to 812 keV from gamma-rays of all other energies. Such resolution and detection is referred to herein as tuned detection. It is to be appreciated that the tuning is accomplished on-line by electronic components connected to the detectors which resolve and analyze detector signals of a selected energy range or off-line by computer analysis.

Thorium-232, uranium-238, uranium-235, their daughter nuclides, and potassium-40 constitute the great majority of naturally-occurring radioactive elements. Most of these elements emit gamma rays at a plurality of energies. However, 811 keV is not one of the energies at which the naturally-occurring elements emit gamma rays copiously, although gamma rays from these nuclides that are scattered in or out of the detector can appear at 811 keV in the energy spectrum. The effect of these gamma rays on the detector response depends on the specific activity of the cobalt-58 tracer in the vicinity of the borehole 12. For absolute specific tracer activity measurements, it is desirable to measure the background in interval 16 prior to tracer injection. For qualitative applications this procedure is not required.

Correlation between the vertical position of detector 32 and the reading at that point yields an indication of injection water breakthrough (as evidenced by the tracer detection) along interval 16. If it is determined that water is being produced within specific zones of interval 16, conventional water shutoff procedures may be utilized in those zones to prevent further water production.

It is to be appreciated that the instant method is useable in connection with virtually any fluid-injection technique wherein a gamma-ray-emitting radioactive tracer within the fluid is to be monitored to determine fluid movement and location within a formation.

While the method has been particularly shown and described with reference to the foregoing preferred embodiment, it will be understood by those skilled in the art that other changes in form and detail may be made therein without departing from the spirit and scope of the invention as defined in the appended claims.

I claim:

1. A radioactive logging method for evaluating a well bore and its surrounding formation in which gamma-ray-emitting elements may be naturally present, comprising the steps of,
   injecting cobalt-58 into the formation; and
   traversing the well bore with a gamma-ray-detection system which is tuned to detect gamma-ray-emission of the 811 keV energy level.

2. A radioactive logging method for evaluating a well bore and its surrounding formation in which gamma-ray-emitting elements may be naturally present, comprising the steps of, traversing the well bore with a gamma ray detection system thereby creating a base log, subsequently injecting cobalt-58 into the formation; and then
   traversing the well bore with said gamma-ray-detection system tuned to detect gamma-ray-emissions of the 811 keV energy level.

3. A radioactive logging method for evaluating a well bore and its surrounding formation in which uranium thorium, or potassium may be naturally present, comprising the steps of,
   traversing the well bore with a gamma-ray-detection system thereby creating a base log;
   injecting cobalt-58 into the formation; and
   thereafter traversing said well bore with said gamma-ray-detection system tuned to detect gamma-ray-emissions at the 811 keV energy level thereby creating a second log indicative of a profile of said well bore and its surrounding formation.

* * * * *